Harold L. Bergerson
David S. Potter
INVENTORS

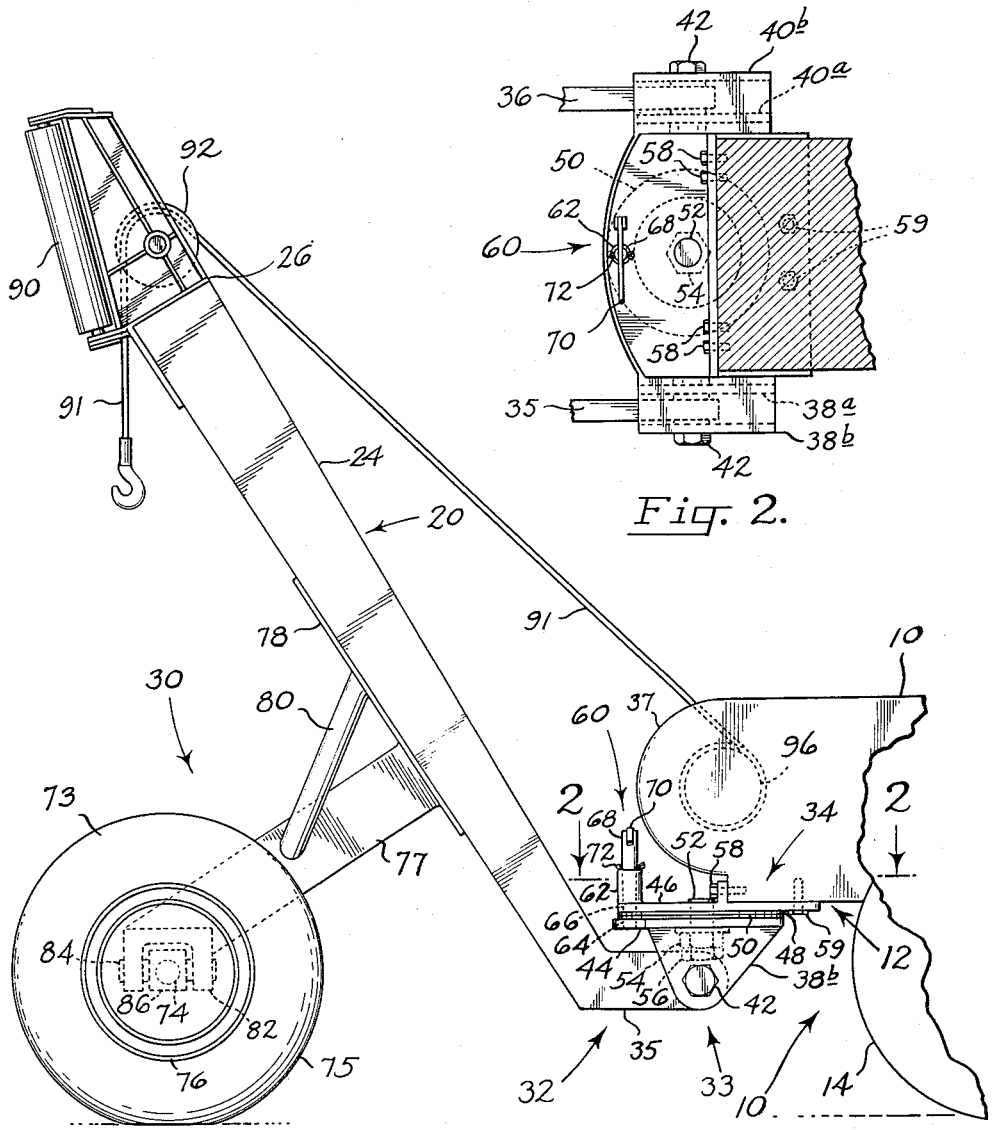

United States Patent Office 3,119,504
Patented Jan. 28, 1964

3,119,504
WHEEL-SUPPORTED BOOM AND VEHICLE
Harold L. Bergerson, Keasey Route, and David S. Potter, both of Vernonia, Oreg.; said Potter assignor to said Bergerson
Filed Sept. 12, 1960, Ser. No. 55,220
11 Claims. (Cl. 254—139.1)

This invention relates to a vehicle comprising a tractor and boom combination, and more particularly to such a vehicle where the boom is provided with dolly wheel means for supporting the boom. The vehicle is particularly well adapted for logging use, and is characterized by a number of novel features that make it a practical and useful piece of equipment for handling logs after they have been felled.

In the woods it is common to move logs from one place to another by pulling them over the ground. Thus, the end of a bundle of logs may first be lifted from the ground using a logging arch at the rear of a tractor, and the logs may then be pulled while dragging their trailing ends. Such a load on the logging arch tends to pull the rear of the tractor downwardly and exert a lifting force on the front of the tractor. To make the tractor more stable while handling a load, with the weight of the tractor distributed between front and rear ends, wheel support may be provided under the boom, which reduces or eliminates front end lifting tendencies.

Generally, it is an object of the invention to provide an improved construction for a wheel-supported boom that is particularly well adapted for use where muddy conditions exist that tend to mire the wheels of conventional constructions.

Another general object is to provide a vehicle with a wheel-supported boom with an improved construction for the mounting for the wheel of the boom whereby it may travel over rough terrain.

In an embodiment of the invention, an arched boom with downwardly depending legs is mounted on the rear end of a tractor frame. The legs of the boom are mounted on the tractor frame by pivotally connecting them to one of a pair of horizontally disposed swivel plates positioned between the boom legs. The swivel plates are interconnected by means accommodating relative rotation about an upright axis. The other of the pair of swivel plates is fixed to the tractor frame. Thus, the rear end of the boom can swing up and down, and the boom may also swivel about an upright axis, adjacent its connection to the tractor. Forces exerted on the sides of the boom, such as would tend to cause twisting of the boom, are withstood by the swivel plates described that extend over relatively large radiuses about the boom swivel axis. The swivel provided the boom enables it to swing on a turn in the direction of the logs trailed by the tractor. Supporting the boom are dolly wheels constrained to a line of travel extending longitudinally of the boom. The wheels in this way remain in a position under the boom where they give optimum support, and where in practice they have been formed to exhibit least likelihood of miring. The mounting for the dolly wheels includes pivot means whereby they may tilt from side to side, to take care of uneveness in ground contour. This feature inhibits undue stressing of the boom when the tractor travels over rough terrain.

Thus, it is a more specific object of the invention to provide, for a vehicle, an improved boom construction wherein the boom is supported by dolly wheel means constrained to a line of travel extending longitudinally of the boom, and where turning of the boom and vehicle combination is facilitated by a swivel connection between the boom and the tractor.

Another more specific object is to provide an improved vehicle and boom combination that includes a wheel-supported boom, and as a means attaching the boom to the vehicle, a pair of swivel plates disposed between legs of the boom, one of which is fixed to the vehicle and the other of which pivotally mounts the lower end of the boom, the swivel plates absorbing in various positions of the boom stresses applied thereto.

A still further object is to provide a novel vehicle and boom combination wherein the boom may swivel with respect to the vehicle frame and also swing up and down, and is supported by dolly wheel means constrained to travel in a path extending longitudinally of the boom, and where means is provided mounting the dolly wheel means that enables it to tilt from side to side about an axis extending longitudinally of the boom so that the dolly wheel means may travel easily over rough terrain.

Other objects and advantages of the invention will become apparent as the following description is read in conjunction with the accompanying drawings, wherein:

FIG. 1 is a side elevation of the rear end of a tractor having a boom constructed according to this invention, the boom extending upwardly from the rear end;

FIG. 2 is a cross-sectional view taken along the line 2—2 in FIG. 1, illustrating details of the mounting for the boom on the tractor frame.

Figure 3:
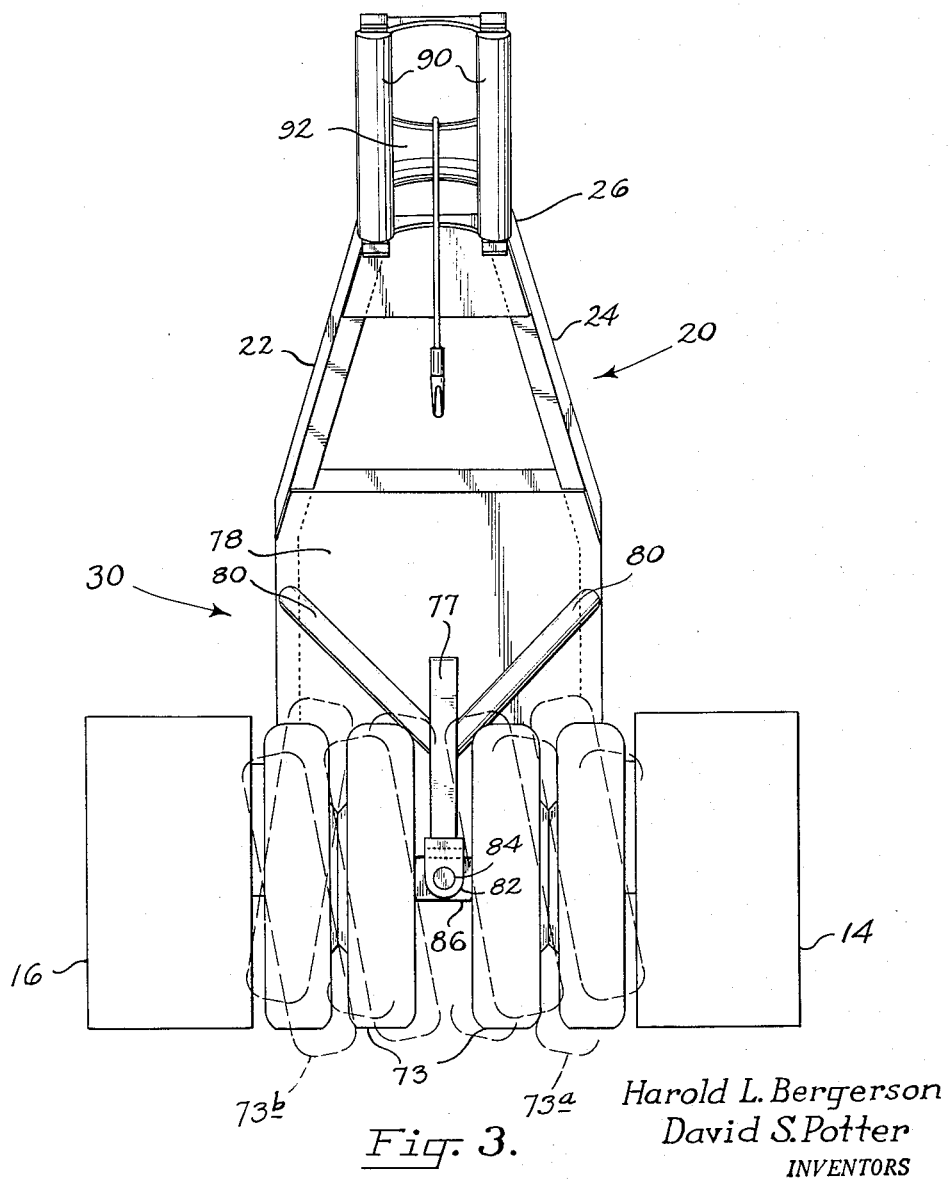
FIG. 3 is an end elevation of the rear end of the boom and tractor combination shown in FIG. 1.

Referring now to the drawings, a conventional form of crawler tractor is indicated generally at 10. This comprises a tractor frame 12 and mounted on either side of the tractor frame are crawler treads, indicated at 14 and 16. The crawler treads constitute support means for the tractor disposed on either side of the tractor frame supporting the tractor for movement over the ground. Ordinarily, in the Pacific Northwest at least, crawler tractors are used most in logging operations. While the invention is described in connection with a crawler tractor, it should be obvious that other forms of tractors including wheel-supported tractors could be employed where such is found to be desirable.

Extending upwardly and rearwardly from the rear end of tractor frame 12 is an elongated arched boom, indicated generally at 20. This has a pair of diverging and spaced-apart legs 22, 24 joined together at top 26 for the boom. Substantially directly under boom top 26 is a dolly wheel means 30 that supports the boom. Means mounting the base of the boom to the tractor is indicated at 32, said means 32 having pivot mechanism or means 33 accommodating swinging of the boom up and down, and swivel means 34 accommodating swivelling of the boom to the right and left of the longitudinal axis of the tractor.

Specifically, and first considering pivot means 33, legs 22, 24 have at their bottom set of ends parallel, forwardly projecting extensions 35, 36. These extend in a horizontal direction under a winch 37 provided the crawler tractor. Each extends between a pair of mating, depending ear portions, such being indicated for extension 35 at 38a, 38b and for extension 36 at 40a, 40b. The two pairs of depending ear portions constitute laterally spaced-apart mounting portions. Securing the extensions to the spaced-apart pairs of ears or mounting portions and accommodating swinging of boom 20 up and down about an axis extending transversely of the tractor frame are nut and bolt assemblies 42.

Ears 38a, 38b and 40a, 40b are joined to the underside of a horizontally disposed bottom swivel plate 44 disposed between leg extensions 35, 36. Positioned over the top of swivel plate 44 is a mating, horizontally disposed top swivel plate 46. Between the swivel plates are coextensive wear and spacer rings 48, 50. Ring 50 is secured, as by welding, to the top surface of swivel plates 44, and ring 48 is secured in a similar manner to the bottom surface of plate 46. The swivel plates are connected together by means of a stud 52 secured as by welding to the top swivel plate and extending downwardly through an accommodating bore provided the bottom swivel plate, and nuts 54, 56 tightened on a threaded lower end portion of stud 52. The swivel plates 44, 46, rings 48, 50 and stud 52 together make up swivel means 34, and provide a swivel axis for boom 20 that coincides with the center axis of stud 52.

Top swivel plate 46 is secured to the tractor frame by screws 58 that are grouped in pairs on either side of the stud 52, and screws 59 extending upwardly into frame 12 of the tractor. The various screws hold the top swivel plate firmly on the tractor frame. Wear rings 48, 50 between the two swivel plates have relatively large radiuses, as do the swivel plates, and this enables the plates and wear rings to absorb without failure the normal stresses applied thereto as the result of handling a load. The wear rings and swivel plates, and the provision of a boom with legs at the base thereof connected to the the bottom swivel plate at locations spaced to either side of the swivel axis for the boom, make the construction particularly well adapted to withstand twisting of the boom, such as is produced when the boom handles a load disposed to one side of the rear of the tractor.

Under certain conditions, as when clearance is limited and when moving the tractor without using the boom, it is desirable to lock the boom in place with the boom extending directly to the rear of the tractor and aligned with the longitudinal axis of the tractor. A selectively adjustable, releasable latch mechanism is included whereby the swivel plates may be locked together when the boom occupies such a longitudinally aligned position. Such latch mechanism is indicated generally in FIGS. 1 and 2 at 60.

Describing latch mechanism 60, 62 indicates a sleeve joined to upper swivel plate 46. Formed in the top and bottom swivel plates and the wear and spacer rings therebetween are bores 64, 66. These move into registry with the boom extending directly to the rear of the tractor. The bores also then register with the hollow interior of sleeve 62. Slidable up and down in sleeve 62 is a lock pin 68. The lock pin is shifted up and down in the sleeve by a pivotally mounted handle 70. With the lock pin lowered into bores 64, 66 the swivel plates are locked from relative movement. The pin may be held in a raised, nonlocking position, by means of pin 72 inserted through accommodating bores provided lock pin 68 and sleeve 62.

Dolly wheel means 30 underneath the boom and to the rear of mounting means 32 comprises, in the embodiment illustrated, four laterally spaced wheels 73 journaled on an axle 74. The wheels are spaced so that with the tractor traveling straight ahead they are equally grouped on either side of the longitudinal axis of the tractor and travel between treads 14, 16 of the tractor, can be seen with reference to FIG. 3. The wheels are conventional, and may take the form of the usual pneumatic tires 75 mounted on rims 76.

The mounting for wheels 73 beneath boom 20 comprises an arm 77 joined to a plate 78 that is fastened to the legs of the boom. Arm 77 inclines downwardly and to the rear of the boom. The arm is braced on plate 78 by means of braces 80. Arm 77 terminates at its lower end in a yoke 82. Journaled in yoke 82 are trunnions 84 projecting from opposite sides of an axle mounting 86. Axle 74 is supported in axle mounting 86. Yoke 82 and trunnions 84 constitute a pivot means in the construction accommodating tilting of the axle about an axis extending normally of and through the axle and longitudinally of the boom.

The pivot means mounting the axle enables wheels 73 to cant or tilt from side to side, generally between the positions indicated by the dashed outlines 73a, 73b in FIG. 3. This canting of the wheels is desirable when the boom is pulled by the tractor over uneven terrain, since it enables the wheels to follow the ground with all of them tending to provide their share of support. It also has the effect of reducing localized high stressing in the boom. While the wheels may tilt about a longitudinally extending axis, they are constrained by arm 77 (which is fixed to the boom) from swinging movement from side to side about any vertical axis. In other words, they are constrained by the fixed arm to a line of travel that extends longitudinally of the boom. In this way they are in a position at all times to provide optimum support, and exhibit minimum tendency to bog or mire in mud.

Completing the description of the boom, adjacent boom top 26 are a pair of fair lead rollers 90. These are journaled on the top of the boom, and guide a cable 91 that extends between the fair lead rollers and that is used in grappling onto logs. Supporting cable 91 is a roller 92. Cable 91 is wound on the winch drum 96 of winch 37. When traveling over the ground with the boom not in use, the cable may be secured to the top of the boom, and the winch drum rotated to wind up the cable. This ultimately tensions the cable, and causes the boom to swing upwardly about the pivot axis provided by nut and bolt assemblies 42 to a raised position with wheels 73 off the ground.

We claim:

1. A logging vehicle comprising a tractor having a tractor frame, lateral support means on either side of the frame for supporting the tractor for movement over the ground, an arched boom extending upwardly from the rear of the tractor frame, said boom at the base thereof terminating in a pair of laterally spaced-apart legs, a pair of complementary and horizontally disposed swivel plates disposed intermediate the legs of the boom, means interconnecting the plates whereby they are relatively rotatable about an upright axis, means joining the upper plate in fixed position to the tractor frame, laterally spaced-apart mounting portions joined to the lower plate and depending therfrom, one on either side of said upright axis, means pivotally connecting the legs of the boom to said portions, one to each mounting portion, and accommodating swinging of the boom about a horizontal axis, dolly wheel means for supporting the boom disposed beneath the boom at a location rearwardly of said swivel plates, and means mounting the dolly wheel means on the boom constructed to constrain the wheel means to a line of travel extending longitudinally of the boom, said dolly wheel means fulcruming the boom whereby a load exerted downwardly on the end of the boom produces a force urging said lower swivel plate toward said upper swivel plate.

2. The vehicle of claim 1 which further comprises means for locking the swivel plates together, said means comprising a pin accessible from above the upper of the swivel plates, apertures provided the swivel plates that move to a registering position with the boom aligned longitudinally with the tractor, and means mounting the pin above the swivel plates and accommodating movement of the pin into the apertures when they are in registering position thus to lock the swivel plates in fixed relative position.

3. A logging vehicle comprising a tractor having a tractor frame, lateral support means on either side of the tractor frame for supporting the tractor for movement over the ground, an arched boom extending upwardly from the rear of the tractor frame, said boom at the base thereof terminating in a pair of laterally spaced-apart legs, a pair of complementary horizontally disposed swivel plates disposed intermediate the legs of the boom and means interconnecting the plates whereby they are relatively rotatable about an upright axis, means joining in a fixed position one of the plates to the tractor frame, means pivotally connecting the legs of the boom to the other plate with the boom swingable with respect to said other plate about a horizontal axis, dolly wheel means including an axle and at least a pair of dolly wheels for supporting the boom disposed to the rear of the swivel plates and beneath the boom, and means mounting the dolly wheel means on the boom constructed to constrain the wheel means to a line of travel extending longitudinally of the boom, the means mounting the dolly wheel means including pivot means accommodating tilting of the dolly wheel means about a tilt axis extending longitudinally of the boom.

4. The combination of a tractor having a tractor frame and lateral support means on either side of the frame for supporting the tractor for movement over the ground, a boom adjacent the rear of the tractor extending upwardly from the tractor frame, means mounting the base of the boom on said tractor frame including swivel means accommodating swivelling of the boom about an upright axis and pivot mechanism constructed to accommodate swinging of the boom about an axis extending transversely of the tractor, said swivel means comprising a pair of complementary and horizontally disposed swivel plates accommodating swivel movement about an upright axis with one plate being secured in a fixed position to the tractor frame and the other plate opposite said one plate and free to rotate relative thereto, said pivot mechanism connecting the base of said boom to said other of said swivel plates, said swivel means and pivot mechanism accommodating said swivelling and swinging of the boom while preventing movement of the boom about a horizontal axis extending longitudinally of the tractor, dolly wheel means for supporting the boom disposed beneath the boom, and means mounting the dolly wheel means on the boom constructed to constrain the wheel means to a line of travel extending longitudinally of the boom, said means mounting the dolly wheel means including pivot means accommodating tilting of the dolly wheel means about a tilt axis extending longitudinally of the boom.

5. The combination of a tractor having a tractor frame and lateral support means on either side of the frame for supporting the tractor for movement over the ground, a boom adjacent the rear of the tractor extending upwardly from the tractor frame, means mounting the base of the boom on said tractor frame including swivel means accommodating swivelling of the boom about an upright axis and pivot mechanism constructed to accommodate swinging of the boom about an axis extending transversely of the tractor, said swivel means comprising a pair of complementary and horizontally disposed swivel plates accommodating swivel movement about an upright axis with one plate being secured in a fixed position to the tractor frame and the other plate opposite said one plate and free to rotate relative thereto, said pivot mechanism connecting the base of said boom to said other of said swivel plates, said swivel means and pivot mechanism accommodating said swivelling and swinging of the boom while preventing movement of the boom about a horizontal axis extending longitudinally of the tractor, selectively adjustable means for locking the swivel means whereby swivelling of the boom is inhibited with the boom in a position extending longitudinally of the tractor, dolly wheel means for supporting the boom disposed beneath the boom, and means mounting the dolly wheel means on the boom constructed to constrain the wheel means to a line of travel extending longitudinally of the boom, said means mounting the dolly wheel means including pivot means accommodating tilting of the dolly wheel means about a tilt axis extending longitudinally of the boom.

6. In a vehicle, the combination of a tractor having a tractor frame and lateral support means on either side of the tractor frame for supporting the tractor for movement over the ground, a boom adjacent the rear of the tractor extending upwardly from the tractor frame, means mounting the base of the boom on the tractor frame including swivel means accommodating swivelling of the boom about an upright axis and pivot mechanism constructed to accommodate swinging of the boom about an axis extending transversely of the tractor, said swivel means comprising a pair of complementary and horizontally disposed swivel plates accommodating swivel movement about an upright axis with one plate being secured in a fixed position to the tractor frame and the other plate opposite said one plate and free to rotate relative thereto, said pivot mechanism connecting the base of said boom to said other of said swivel plates, said swivel means and pivot mechanism accommodating said swivelling and swinging of the boom while preventing movement of the boom about a horizontal axis extending longitudinally of the tractor, dolly wheel means for supporting the boom including an axle and wheel means journaled thereon disposed beneath the boom, and mounting means mounting the dolly wheel means on said boom, said mounting means, comprising an axle mounting carrying the axle and including pivot means accommodating tilting of the axle about an axis extending normally of and through the axle and longitudinally of the boom, and a support for said axle mounting joined to the boom and holding the axle mounting with the axle carried thereby extending always transversely of the boom.

7. In a vehicle, the combination of a tractor having a tractor frame and lateral support means on either side of the tractor frame for supporting the tractor for movement over the ground, a boom adjacent the rear of the tractor extending upwardly from the tractor frame, means mounting the base of the boom on the tractor frame including swivel means accommodating swivelling of the boom about an upright axis and pivot mechanism constructed to accommodate swinging of the boom about an axis extending transversely of the tractor, said swivel means comprising a pair of complementary and horizontally disposed swivel plates accommodating swivel movement about an upright axis with one plate being secured in a fixed position to the tractor frame and the other plate opposite said one plate and free to rotate relative thereto, said pivot mechanism connecting the base of said boom to said other of said swivel plates, said swivel means and pivot mechanism accommodating said swivelling and swinging of the boom while preventing movement of the boom about a horizontal axis extending longitudinally of the tractor, at least a pair of laterally spaced-apart dolly wheels, an axle for the dolly wheels with the dolly wheels journaled thereon, and mounting means mounting the dolly wheels and axle beneath the boom with the dolly wheels supporting the boom, said mounting means comprising an axle mounting carrying the axle with the wheels on either side thereof, said axle mounting including pivot means accommodating tilting of the axle about an axis extending normally of and through the axle and longitudinally of the boom, and a support for said axle mounting joined to the boom and holding the axle mounting with the axle carried thereby extending always transversely of the boom.

8. A logging vehicle comprising a tractor having a tractor frame, lateral support means on either side of the tractor frame for supporting the tractor for movement over the ground, an arched boom extending upwardly from the rear of the tractor frame, said boom at the base thereof terminating in a pair of laterally spaced-apart legs, a pair of complementary horizontally disposed swivel plates disposed intermediate the legs of the boom and means interconnecting the plates whereby they are relatively rotatable about an upright axis, means joining in a fixed position one of the plates to the tractor frame, means pivotally connecting the legs of the boom to the other plate with the boom swingable with respect to said other plate about a horizontal axis, dolly wheel means including an axle and at least a pair of dolly wheels for supporting the boom disposed to the rear of the swivel plates and beneath the boom, and means mounting the dolly wheel means on the boom constructed to constrain the wheel means to a line of travel extending longitudinally of the boom, the means mounting the dolly wheel means comprising an axle mounting carrying the axle and disposed between the dolly wheels, said axle mounting including pivot means accommodating tilting of the axle about an axis extending normally of and through the axle and longitudinally of the boom, and a support for said axle mounting joined to the boom and holding the axle mounting with the axle carried thereby extending always transversely of the boom.

9. In a vehicle, a tractor including a tractor frame supported for movement over the ground, an arched boom terminating at the base thereof in a pair of laterally spaced-apart legs positioned at the rear of the tractor with the boom extending upwardly from the rear of the tractor frame, said boom including ground support means disposed beneath it and located to the rear of the tractor for supporting the boom for movement over the ground, and means mounting the base of said boom on said tractor frame, said means comprising a first swivel plate disposed in a substantially horizontal position and substantially centered intermediate the legs of said boom, means securing said first swivel plate in a fixed position on said tractor frame, a second swivel plate disposed in a substantially horizontal position and substantially centered intermediate the legs of the boom, said first and second swivel plates complementing each other in an underlying-overlying interrelationship, means interconnecting the swivel plates whereby they are relatively rotatable about an upright swivel axis, and means pivotally connecting the legs of said boom to said second swivel plate at locations disposed on either side of said upright swivel axis and with the legs of the boom pivotable about a horizontal transverse axis, said means for mounting the base of the boom being operable to hold the boom upright and prevent it from tilting while enabling the boom to trail the tractor on its turn side when the tractor makes a turn.

10. In a vehicle, a tractor including a tractor frame supported for movement over the ground, an arched boom terminating at the base thereof in a pair of laterally spaced-apart legs positioned at the rear of the tractor with the boom extending upwardly from the tractor frame, said boom including ground support means disposed beneath it and located to the rear of the tractor for supporting the boom for movement over the ground, and means mounting the base of said boom on said tractor frame, said means comprising a first swivel plate disposed in a substantially horizontal position substantially centered intermediate the legs of said boom, means securing said first swivel plate in a fixed position on said tractor frame, a second swivel plate disposed in a substantially horizontal position and substantially centered intermediate the legs of the boom, said first and second swivel plates complementing each other in an underlying-overlying interrelationship, means interconnecting the swivel plates whereby they are relatively rotatable about an upright swivel axis, means pivotally connecting the legs of the boom to said second swivel plate at locations disposed on either side of said upright swivel axis and with the legs of the boom pivotable about a horizontal transverse axis, and releasable latch means for locking together the swivel plates with the boom in a position extending longitudinally of the tractor, said releasable latch means enabling an operator selectively either to lock the boom from movement about said swivel axis or to release the boom with the boom in both cases being pivotable about said horizontal transverse axis, said mounting for the base of the boom being operable to hold the boom upright and prevent it from tilting and enabling the base of the boom to trail the tractor on its turn side when the tractor makes a turn.

11. A vehicle comprising the combination of a tractor having a tractor frame and means on either side of the tractor frame for supporting it for movement over the ground, a boom adjacent the rear of the tractor extending upwardly from the rear of said tractor frame, a connection between the base of said boom and said tractor frame, said connection comprising swivel mechanism providing for swiveling of the boom including a pair of complementary and horizontally disposed swivel plates disposed at the base of the boom and rotatable relative to each other about an upright axis thus to enable swiveling of the boom, one of said plates being secured to said boom, said connection also including pivot mechanism constructed to accommodate up and down swinging of the base of the boom about a horizontal axis extending transversely of the tractor, selectively adjustable means for locking the two swivel plates together whereby swiveling of the boom is prevented, said boom being fixed in a position extending longitudinally of the tractor on locking of the swivel plates, and dolly wheel means for supporting the boom disposed beneath and mounted on the boom, said dolly wheel means being connected to the boom in such a manner as to be constrained to a line of travel extending longitudinally of the boom.

References Cited in the file of this patent

UNITED STATES PATENTS

| | | |
|---|---|---|
| 2,073,269 | Skibbe | Mar. 9, 1937 |
| 2,292,882 | Langdon | Aug. 11, 1942 |
| 2,518,322 | Hovey-King et al. | Aug. 8, 1950 |
| 2,691,451 | Westfall | Oct. 12, 1954 |
| 2,731,099 | Schroeder | Jan. 17, 1956 |